3,281,409
METHOD FOR THE SEPARATION OF AGAROPECTIN FROM AGAROSE
John Blethen, Rockland, Maine, assignor to Marine Colloids, Inc., Springfield, N.J., a corporation of Delaware
No Drawing. Filed Aug. 4, 1964, Ser. No. 387,483
4 Claims. (Cl. 260—209)

The invention relates to the treatment of agar for the recovery of the non-ionic polysaccharide agarose separated from the ionic polysaccharide agaropectin.

Commercial agar has been shown to contain, in addition to insoluble debris, proteinaceous material and soluble salts, all of which may be considered contaminants, two major separable polysaccharides. One of these, called agarose, is a strongly gelling, neutral, non-ionic polysaccharide which is regarded as consisting of 1,3-linked β-D-galactopyranose and 1,4-linked 3,6-anhydro-α-L-galactopyranose units. The other, called agaropectin, is a less clearly defined, more complex polysaccharide having sulfate groups attached to it in a manner that as yet has not been identified (Araki, C., Bull. Chem. Soc. Japan, 29, 543 (1956)). In addition, some carboxylic acid is present, occurring as a condensation product of the ketone group of pyruvic acid with a D-galactopyranose moiety of the polymer chain.

Particularly for electrophoretic applications, there is a substantial demand for the non-ionic agarose component from which the ionic agaropectin of commercial agar has been separated. The production of agarose from which agaropectin has been separated also has utility in other fields such as microbiology, gel diffusion and chromatography.

It is an object of this invention to provide an improved process for separating dissolved agarose from the undesired agaropectin component of commercial agar.

Early means for separating the ionic agaropectin component from the non-ionic agarose compound involved acetylation of agar to yield agarose acetate and agaropectin acetate (Araki, C., J. Chem. Soc. Japan, 58, 1338 (1937)). Separation of the two acetates was accomplished by the selective solvent action of chloroform, which is a solvent for agarose acetate but is not a solvent for agaropectin acetate. Precipitation of agarose acetate from solution in chloroform was accomplished by the addition of pertroleum ether. The acetate groups were removed by saponification in alcohol and the recovery of the regenerated agarose was accomplished by filtration following neutralization of the solution. The agarose thus obtained was found to be degraded and brown in color.

More recently a method was published for accomplishing the separation of the ionic agaropectin from a solution of agar by causing its precipitation using a quaternary ammonium salt as a selective precipitating agent for the agaropectin leaving the agarose in solution. The prime objective of this separation procedure was to avoid or minimize the degration and discoloration that result from carrying out the earlier acetate procedure (Hjertin, S., Biochim, et Biophys. Acta, 62, 445 (1962)). However, while degradation and discoloration could largely be avoided by resort to the procedure using a quaternary ammonium salt, a major difficulty has been encountered due to failure of the precipitate to agglomerate in a form permitting its effective removal from the agarose solution. While the behavior of different comercial agars varies in this respect, nevertheless in many cases the precipitate that is formed remains as a milky suspension which cannot be removed either by centrifugation or filtration. Moreover, conventional expedients for aiding agglomeration such as heating at high temperatures or adding salts have proved to be unsuccessful in obtaining of more effective separation of the precipitated agaropectin from the agarose solution.

I have found that when to a solution of commercial agar there is added in the dissolved state another polysaccharide such as carrageenan, which is more highly sulfated than the agaropectin component of agar and which becomes precipitated in a separable flocculated form by the additon of a quaternary ammonium salt, agaropectin which otherwise is precipitated in a difficulty separable form by the inclusion of a quaternary ammonium salt in the solution becomes combined in some way with the precipitate formed by the precipitation of the added polysaccharide with the result that when the precipitate of added polysaccharide is removed from the residual agarose solution by filtration or centrifugation the agaropectin also may be effectively removed from the solution and separated from the non-ionic agarose that remains in solution. The agarose remaining in solution may be precipitated as by the addition isopropanol and then recovered as by filtration or centrifugation.

When proceeding in the manner disclosed, very great improvements can be effected in the purity of the agarose recovered from commercial agar. Agarose may be produced that is of extremely high quality having an ash content below 1% by weight and a sulfate content varying from 0.0–0.5% by weight based on the barium sulfate gravimetric method.

The practice of this invention is illustrated by the following examples:

*Example 1*

2.40 grams of carrageenan was dissolved in 800 mls. of deionized water at room temperature. 12 grams of agar was stirred in and the mixture heated to boiling in a steam pot. 200 mls. of a hot 5% solution of benzyldimethyl {2-[2-(p - 1,1,3,3 - tetramethylbutylphenoxy)ethoxy]-ethyl} ammonium chloride, which is commercially produced and sold by Rohm & Haas under the trade name Hyamine 1622 (hereinafter referred to more briefly as Hyamine 1622) was added to the stirred solution. Within five minutes a dense flocculent precipitate formed; without the added carrageenan, only a milky emulsion formed. 40 grams of a diatomaceous earth filter aid was carefully stirred in and the mixture pressure filtered to yield a clear filtrate which was poured into 1.4 volumes of 99% isopropanol effecting precipitation of the agarose. The later was strained off, washed with 63% isopropanol two times and once with 85% isopropanol, then aspirated under a rubber dam and dried at 60° C. in a circulating air oven. Yield, 8.1 grams (67.5%).

*Analysis.*—9.11% $H_2O$; 0.46% ash, corr. for $H_2O$; 0.40% $SO_4$, corr. for $H_2O$.

*Example 2*

48 grams of carrageenan was dissolved in 13.2 kgs. of tap water. 240 grams of agar was stirred in and the mixture heated to 99–100° C. with live steam during a 7-minute period. The temperature was maintained there for three minutes, then a hot 5% Hyamine 1622 solution (4 kgs.) was stirred in. In four minutes a curdy precipitate started to settle. 800 grams of the filter aid used in Example 1 was mixed in and the suspension filtered by pressure. The filter cake in the press was rinsed with hot water to yield 20.2 kgs. of clear filtrate, including the rinse. The filtrate was cooled to 66° C. and poured into 60 l. of 99% isopropanol to coagulate the agarose. The coagulum was separated from the alcohol and washed several times with 60% alcohol, two of the washes containing 2% acetic acid and a subsequent wash containing just enough aqueous ammonia to render the alcohol neutral to B.D.H. Universal Indicator. The final wash was made with 60% isopropanol. The coagulum was squeezed, then dried in a 60° C. circulating air oven. Yield, 158.7 grams (66.1%).

*Analysis.*—8.49% $H_2O$; 0.24% ash, corr. for $H_2O$; 0.00% $SO_4$.

Example 3

1½ kgs. of agar was mixed with 300 grams of carrageenan and the mixture added to 26.5 gals. of boiling water containing 5 kgs. of the filter aid used in the preceding examples. The mixture was carefully boiled and 25.1 of 5% Hyamine 1622 solution added. In four minutes a dense precipitate formed, and the mixture was filtered. It was added to alcohol, and the resulting precipitate washed three times with 60% alcohol, and dried at 60° C. Yield, 795 grams (53%).

*Analysis.*—10.35% $H_2O$; 0.59 ash, corr. for $H_2O$; 0.00% $SO_4$.

The sulfate content of commercial agar expressed as percent by weight of $SO_4$ determined as stated hereinabove ordinarily is of the order of 1.2% to 4.5%. Based on the agaropectin component, as such, the sulfate content thereof expressed as stated ordinarily varies from about 3.6% to about 13.5%. The sulfate content of carrageenan ordinarily varies from about 20% to about 40%. The sulfate content of the carrageenan used in the foregoing examples was approximately 26%.

The principal sources of carrageenan are the following members of the families Gigartinaceae and Solieriaceae of the class Rodophyceae (red seaweed):

*Chondrus crispus*
*Chondrus ocellatus*
*Eucheuma cottonii*
*Eucheuma spinosum*
*Gigartina acicularis*
*Gigartina pistillata*
*Gigartina radula*
*Gigartina stellata*

Extracts from sea plants of the genus Furcellaria also provide polysaccharides having a sulfate content greater than that of agaropectin. Other suitable polysaccharides are fucoidin, hypnean, Chondroitin sulfate and synthetically sulfated polysaccharides such as sulfates of starch and of cellulose.

Whenever there is included in the initial solution of commercial agar a polysaccharide which is more highly sulfated than the agaropectin component of the polysaccharide, the function of the added polysaccharide is realized in causing precipitated agaropectin to become combined with the precipitate of the added polysaccharide that results from the addition of the quaternary ammonium salt. However, in order to have a significant effect in accomplishing a substantial improvement in the separation of agaropectin from agarose the amount of added polysaccharide should be at least about 5% of the weight of the commercial agar which is brought into the solution that is treated. The amount which is ordinarily preferred in the practice of this invention is about 20% of the agar and it is ordinarily desirable that the amount of added polysaccharide should be at least about 10% by weight of the commercial agar. There is no upper limit to the amount of added polysaccharide side from the practical question of cost. Ordinarily the amount of added polysaccharide is not over about 30% of the weight of the agar and it serves not useful purpose to use an amount of added polysaccharide in excess of 100% of the weight of the agar.

The practice of this invention extends to the employment of any quaternary ammonium salt which, in accordance with the prior proposal, effects selective precipitation of agaropectin from a solution of commercial agar. Other examples of said salts are as listed below giving both the grade name and chemical nature of the salt.

The following are produced commercially by the Textilana Corp.:

Quatrene C–56, a fatty glyoxalidinium chloride.
Quatrene A–5–T, a fatty glyoxalidinium chloride.
Quatrene SFB, soya fatty dialkyl benzyl ammonium chloride.
Quatrene MB, a derivative of myristic acid.
Quatrene CA, fatty amido alkyl quaternary ammonium chloride.

The following is produced by the Geigy Industrial Chemicals:

Quaternary O, a quaternary ammonium salt in the form of an alkyl imidazolinium chloride.

The following are produced by the National Aluminate Corp.:

Nalquat G–9–11, 1-(2-hydroxyethyl)-2-COCO-1(or 3)-(4-chlorobutyl)-2-imidazolinium chloride.
Nalquat G–8–12, mixed 1-(2-hydroxyethyl)-2-heptadecenyl and heptadecadienyl-1 (or 3)-benzyl-2-imidazolinium chloride.
Nalquat G–9–12, mixed 1-(2-hydroxyethyl)-2-heptadecenyl and heptadecadienyl-1 (or 3)-(4-chlorobutyl)-2-imidazolinium chloride.
Nalquat G–9–13, 1-(2-hydroxyethyl)-2-heptadecenyl-1 (or 3)-(4-chlorobutyl)-2-imidazolinium chloride.

The following are produced by Rohm & Haas:

Hyamine 2389, methyldodecylbenzyl trimethyl ammonium chloride and methyl dodecylxylylene bis (trimethyl ammonium chloride).
Hyamine 3500, N-alkyl ($C_{14}$, $C_{12}$, $C_{16}$) dimethyl benzyl ammonium chloride.

The amount of quaternary ammonium salt that is used is that which causes the precipitation of the agaropectin and added polysaccharide. An excess beyond that which induces the precipitation ordinarily is not employed. In the usual case the amount of quaternary ammonium salt is about 10% to about 60% by weight of the agar in solution depending upon the amount of polysaccharide sulfate added, the amount of sulfate in the agar, the degree of sulfation of the added polysaccharide sulfate, and the equivalent weight of the quaternary ammonium salt used.

In the practice of this invention it is of course the case that the initial solution of the agar is effected at a temperature at or approaching the boiling point of water inasmuch as agar is difficultly soluble at lower temperatures and likewise exhibits gelling characteristics when the temperature of a solution containing it falls below about 45° C. Any solution concentration of the agar may be employed, although it is preferable that the process be carried out using a solution containing from about 10 to about 25 grams of agar per liter of solution.

In order to assist in the separation of the combined precipitates of agaropectin and added polysaccharide, it normally is preferable to employ a filter aid. Such filter aids are well known in the art. Suitable filter aid materials of the diatomaceous earth type are commercially available under the trade names Dicalite and Celite. In addition to pressure filtration, one also may, if desired, employ vacuum filtration or centrifugation.

After the precipitated agaropectin and added polysaccharide have been removed, the agarose remaining in the solution may be recovered in any conventional way. Preferably the agarose is precipitated by the addition of isopropanol.

I claim:

1. In a process for the treatment of an aqueous solution of agar containing agarose and agaropectin wherein the agaropectin is selectively precipitated by the inclusion in said solution of a quaternary ammonium salt and the solution containing the dissolved agarose is separated from the precipitated agaropectin, the step of including in said solution prior to the precipitation of the agaropectin as aforesaid a polysaccharide which is substantially more highly sulfated than said agaropectin and is precipitated by the inclusion of said quaternary ammonium salt in said solution whereby precipitated agaropectin becomes combined with the precipitated polysaccharide and separation of the solution of the dissolved agarose from the percipitated agaropectin is facilitated.

2. A process according to claim 1 wherein said included polysaccharide is selected from the group consisting of carrageenan, fucoidin, extacts of the seaweeds of the genus Furcellaria, hypnean, Chondroitin sulfate and synthetically produced sulfates of starch and of cellulose.

3. In a process for the treatment of an aqueous solution of agar which contains agarose and agaropectin wherein the agaropectin is selectively precipitated by the inclusion of a quaternary ammonium salt in said solution while said solution is heated to approximately the boiling point and the solution containing the dissolved agarose is separated from the precipitated agaropectin, the step of including in said solution prior to the precipitation of the agaropectin as aforesaid from about 5% to about 100% on the weight of said agar a polysaccharide which is substantially more highly sulfated than said agaropectin and is precipitated in a readily removable form upon the inclusion in said solution of said quaternary ammonium salt, thereby facilitating removal of precipitated agaropectin from said solution.

4. A process according to claim 3 wherein said polysaccharide is carrageenan amounting to about 15% to about 30% by weight on the weight of the agar.

No references cited.

LEWIS GOTTS, *Primary Examiner.*

J. R. BROWN, *Assistant Examiner.*